United States Patent
Kim (10) Patent No.: US 8,542,649 B2
(45) Date of Patent: Sep. 24, 2013

(54) METHOD AND APPARATUS FOR HANDOVER IN A COMMUNICATION SYSTEM

(75) Inventor: Sang-Ku Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1168 days.

(21) Appl. No.: 11/965,116

(22) Filed: Dec. 27, 2007

(65) Prior Publication Data

US 2008/0159229 A1    Jul. 3, 2008

(30) Foreign Application Priority Data

Dec. 27, 2006  (KR) ................. 10-2006-0135208

(51) Int. Cl.
*H04W 4/00* (2009.01)
*H04W 72/00* (2009.01)

(52) U.S. Cl.
USPC ......................... 370/331; 455/450

(58) Field of Classification Search
None
See application file for complete search history.

(56) References Cited

U.S. PATENT DOCUMENTS

| | | | | |
|---|---|---|---|---|
| 7,440,757 B2 * | 10/2008 | Kwon et al. | ................. | 455/436 |
| 2005/0096051 A1 * | 5/2005 | Lee et al. | ................. | 455/438 |
| 2006/0154671 A1 * | 7/2006 | Kang et al. | ................. | 455/450 |
| 2006/0172738 A1 * | 8/2006 | Kwon et al. | ................. | 455/439 |
| 2006/0276191 A1 * | 12/2006 | Hwang et al. | ................. | 455/436 |
| 2007/0177547 A1 * | 8/2007 | Horn et al. | ................. | 370/331 |
| 2007/0218842 A1 | 9/2007 | Park et al. | | |
| 2007/0249347 A1 * | 10/2007 | Saifullah et al. | ................. | 455/436 |
| 2008/0075178 A1 * | 3/2008 | Lappetelainen et al. | ...... | 375/260 |
| 2008/0268844 A1 * | 10/2008 | Ma et al. | ................. | 455/436 |
| 2010/0029276 A1 | 2/2010 | Hwang | | |

FOREIGN PATENT DOCUMENTS

| | | |
|---|---|---|
| KR | 10-2006-0081887 A | 7/2006 |
| KR | 10-2006-0088072 A | 8/2006 |
| KR | 10-2007-0021564 A | 2/2007 |
| KR | 10-2007-0084949 A | 8/2007 |
| KR | 10-0818766 B1 | 3/2008 |

OTHER PUBLICATIONS

Project IEEE 802.16 Broadband Wireless Access Working Group <http://ieee802.org/16> Title Fast Anchor BS Switching Feedback Report Mechanism and Sleep Mode Support for SHO and FBSS Date Submitted Aug. 31, 2004.*

* cited by examiner

*Primary Examiner* — John Blanton
(74) *Attorney, Agent, or Firm* — Jefferson IP Law, LLP (57) ABSTRACT

A handover method and apparatus in a communication system are provided. A serving Base Station (BS) alternately receives a target BS indicator and a downlink (DL) channel status from a Mobile Station (MS) at intervals of predetermined frames in a BS switching period for handover of the MS. The serving BS determines whether to continue the handover according to a signal received in a frame corresponding to a second reception of the target BS indicator. The method and apparatus provide a detailed definition of operation parameters for a switching time between the serving BS and a target BS.

23 Claims, 8 Drawing Sheets

FIG.7

METHOD AND APPARATUS FOR HANDOVER IN A COMMUNICATION SYSTEM

PRIORITY

This application claims the benefit under 35 U.S.C. §119(a) of a Korean Patent Application filed in the Korean Intellectual Property Office on Dec. 27, 2006 and assigned Serial No. 2006-135208, the entire disclosure of which is hereby incorporated by reference.

BACKGROUND OF THE INVENTION

1. Field of the Invention

The present invention relates to a method and apparatus for handover in a communication system. More particularly, the present invention relates to a method and apparatus for Fast Base Station Switching (FBSS) handover in a communication system.

2. Description of the Related Art

In a communication system, a terminal is provided signal and traffic resources by a serving Base Station (BS). When the terminal moves out of range of the serving BS and into range of a target BS, a hard handover is used to release the signal and traffic resources from the serving BS and allocate the resources of the target BS. However, this hard handover process causes a considerable time delay. If the hard handover occurs during the provision of a service supporting real-time Quality of Service (QoS), for example Voice over Internet Protocol (VoIP), many restrictions due to the time delay may occur.

Recently, consideration has been given to the Fast Base Station Switching (FBSS) handover scheme because it is capable of performing a hard handover quickly. The FBSS handover scheme is a technology for performing handover in synchronization with a Mobile Station (MS) and a BS at a switching time from a serving BS to a target BS. Specifically, an MS that has previously been allocated signal and traffic resources for the candidate BSs to which it will move during handover, transmits information on the handover target BS to the serving BS over a Channel Quality Indicator Channel (CQICH) over which the MS periodically reports a status of Downlink (DL) radio resources. However, a need exists in the FBSS handover scheme for a detailed definition of operation parameters for the switching time between the serving BS and the target BS and for a scheme for scheduling traffic data in the serving BS via a relay station.

SUMMARY OF THE INVENTION

An aspect of the present invention is to address at least the above-mentioned problems and/or disadvantages and to provide at least the advantages described below. Accordingly, an aspect of the present invention is to provide an operation parameters set to minimize the handover time in the FBSS handover scheme.

Another aspect of the present invention is to provide an optimized call processing flow between an MS, a relay station and a BS for execution of FBSS handover.

Another aspect of the present invention is to provide a call processing scheme for calculating the optimized BS switching time during FBSS handover and the corresponding transmission/reception scheduling time of traffic data, to minimize the drop (or interruption) of traffic data during handover.

According to one aspect of the present invention, a handover method of a serving Base Station (BS) in a communication system is provided. The handover method includes alternately receiving a target BS indicator and a downlink (DL) channel status from a Mobile Station (MS) at intervals of predetermined frames in a BS switching period for handover of the MS and determining whether to continue the handover according to a signal received in a frame where the target BS indicator is received in a second time.

According to another aspect of the present invention, a handover apparatus in a communication system is provided. The handover apparatus includes a serving Base Station (BS) for alternately receiving a target BS indicator and a downlink (DL) channel status from a Mobile Station (MS) at intervals of predetermined frames in a BS switching period for handover of the MS and for determining whether to continue the handover according to a signal received in a frame where the target BS indicator is received in a second time.

BRIEF DESCRIPTION OF THE DRAWINGS

The above and other aspects, features and advantages of certain exemplary embodiments of the present invention will be more apparent from the following detailed description when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a scheduling scheme for minimizing an interrupted period of traffic data in an Anchor Switching Report (ASR) period indicative of the time for which an MS switches its BS during handover and a call processing flow for the FBSS handover.

Figure 1A:
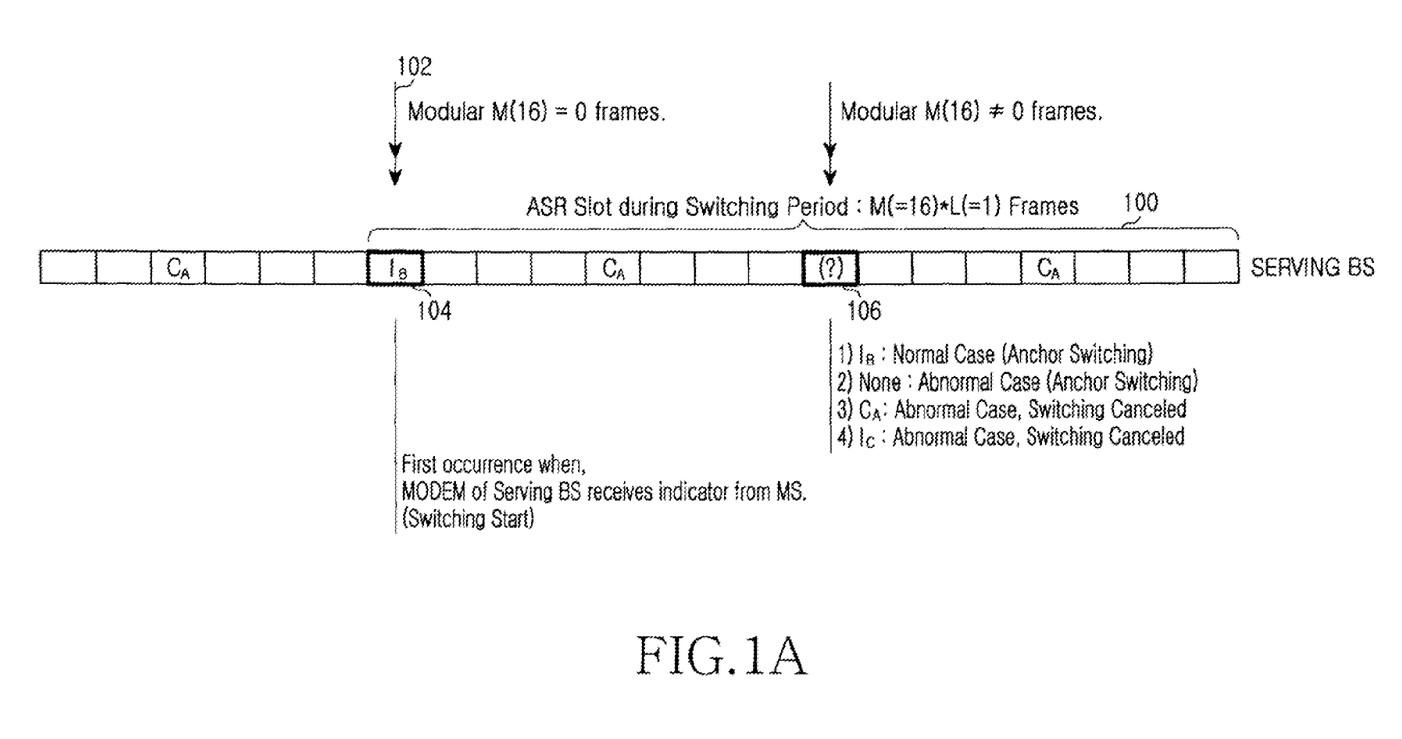
FIG. 1A illustrates a scheduling procedure in an Anchor Switching Report (ASR) period according to an exemplary embodiment of the present invention.
Figure 1B:
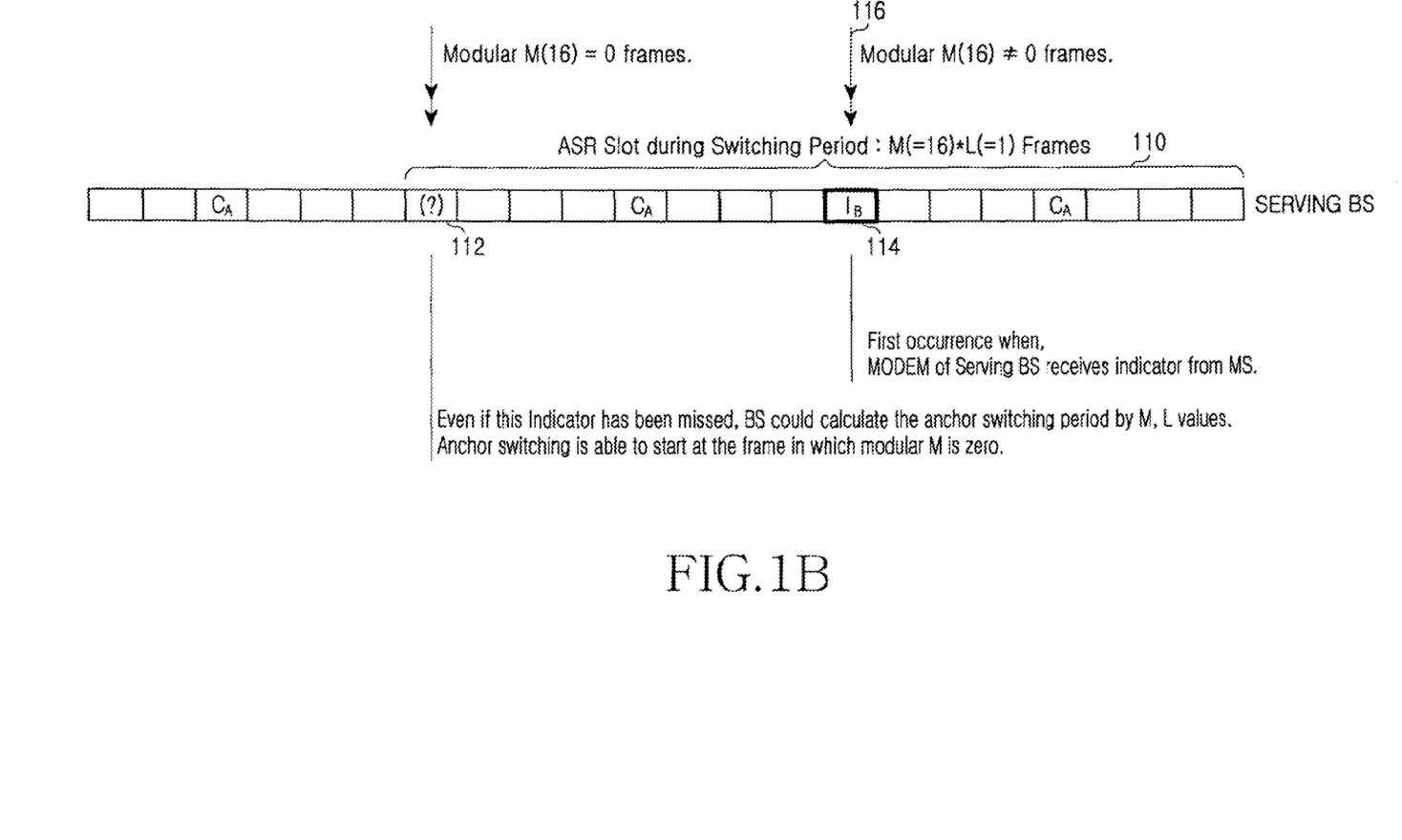
FIG. 1B illustrates another scheduling procedure in an ASR period according to an exemplary embodiment of the present invention.

FIGS. 1A and 1B illustrate scheduling procedures for an ASR period according to an exemplary embodiment of the present invention.

Referring to FIGS. 1A and 1B, ASR periods 100 and 110 are periods for which an MS is connected to a target BS after interrupting the connection from a serving BS, to perform FBSS handover. That is, the ASR period is a period for which an ASR slot, over which the MS reports a target BS indicator and a status of a radio DL channel, is repeated at intervals of preset frames. Here, the ASR slot is performed at intervals of preset P frames, and is set such that it should alternately transmit the target BS indicator and the channel status in interleaving order. The ASR period is set as a product of the total number M of frames, or a slot length until the next ASR period, and a repetition coefficient L of the M (i.e., ASR=M× L), and for this period, the MS attempts BS switching.

In an exemplary implementation illustrated in FIG. 1A, the ASR period starts from a frame 102 whose Modular (M) value is 0, and the elements {M,L} for determining the ASR period have a value of {16,1}. That is, if M=16 and L=1, 16 frames are set as the ASR period, or BS switching period. In the ASR period of 16 frames, the MS alternately reports an indicator for the target BS and an indicator for the channel status at an interval of every 4 frames. Accordingly, a modem of the serving BS alternately detects each of the indicator for the target BS and the indicator for the channel status report two times in the ASR period. Therefore, even if the modem misses the target BS indicator from the MS one time, it still has an opportunity to normally detect the BS switching period.

An increase in the values of M and L excessively increases the BS switching period. Conversely, a decrease in the values of M and L reduces the number of reports on the target BS indicator and the channel status detected in the serving BS, thus causing a decrease in the detection accuracy.

A detailed description will now be made of an exemplary BS switching procedure between the MS, the serving BS and the target BS during FBSS handover.

In FIGS. 1A and 1B, ASR periods 100 and 110 each indicate the time for which the MS switches from the serving BS to the target BS, $C_A$ is an indicator indicating a status report for a radio DL channel, and $I_B$ is an indicator indicating the target BS. The indicator $C_A$ alternates with the indicator $I_B$ at intervals of P frames, where P is a predetermined value and is, for example, 4 (P=4).

FIG. 1A illustrates an exemplary scheduling procedure for use during a good Uplink (UL) radio channel state. Upon receiving $I_B$ from the MS in the first ASR slot 104, or M=0 frame, of the ASR period 100, the modem of the serving BS recognizes the start of BS switching for FBSS handover.

Thereafter, the serving BS determines whether to perform the BS switching according to the value received in the second ASR slot 106. In the ASR slot 106, the serving BS can receive four types of signals, each of which is explained below. Upon receipt of the first or second signal, the serving BS continues the ongoing handover procedure according to an exemplary embodiment of the present invention. Upon receipt of the third or fourth signal, the serving BS cancels the ongoing handover procedure according to another exemplary embodiment of the present invention.

In the ASR slot 106, the serving BS can receive the following four types of signals.

First, upon receiving $I_B$ in the ASR slot 106, the serving BS continues the ongoing handover procedure.

Second, upon failure to detect any signal in the ASR slot 106, the serving BS continues the ongoing handover procedure. In so doing, the serving BS determines that, although the MS has transmitted the target BS indicator, the serving BS has failed to normally detect it.

Third, the serving BS receives a signal $C_A$ in the ASR slot 106 indicating that the MS has cancelled the current handover. In an alternative exemplary implementation, even though the MS desires to cancel the ongoing handover for the ASR period 100, if the corresponding ASR slot is the time for which the MS should transmit the target BS indicator, the MS does transmit the corresponding target BS indicator. However, after expiration of the ASR period 100, when the MS should report a status of the radio DL channel to the serving BS, the MS does not report the status. In this case, therefore, the serving BS performs a procedure for canceling the ongoing handover due to the rule violation.

Fourth, upon receiving an unknown or wrong indicator $I_C$ in the ASR slot 106, the serving BS performs a procedure for canceling the ongoing handover. In doing so, the serving BS determines that the data transmitted by the MS is damaged due to the poor state of the radio UL channel.

FIG. 1B illustrates an exemplary scheduling procedure for a poor UL radio channel state wherein the modem of the serving BS has failed to normally detect the $I_B$ transmitted from the MS in the first ASR slot 112, or M=0 frame, of the ASR period 110. Upon receiving the $I_B$ transmitted by the MS after 8 frames, i.e., in the second ASR slot 114, the serving BS performs a modular operation on the second ASR slot 114 and determines whether the result is 0. If the M value 116 for the second ASR slot 114 is not 0, the serving BS recognizes that the BS switching actually started in the frame 112. In doing so, the serving BS determines that even though the $I_B$ was transmitted from the MS to the serving BS in the frame 112, the $I_B$ was missing. Herein, the ongoing handover procedure is carried out.

Figure 2:
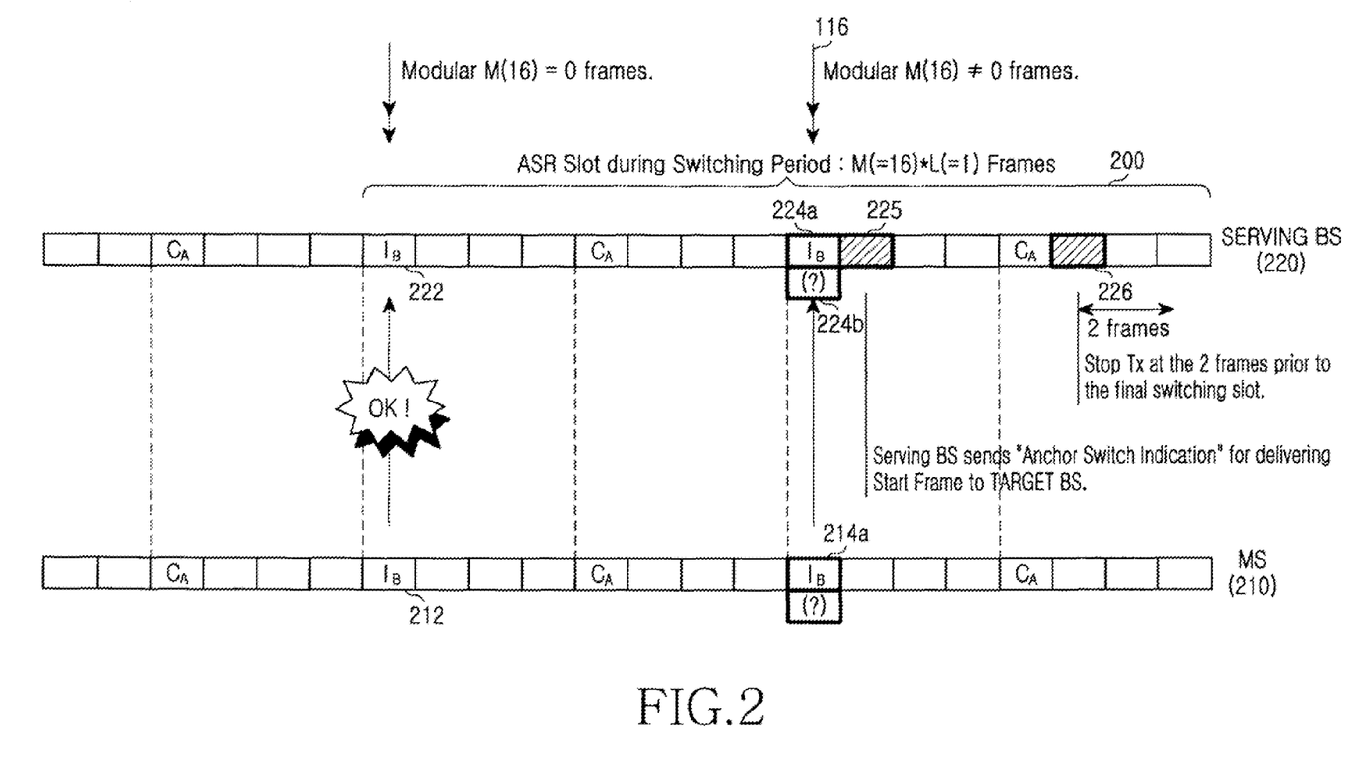
FIG. 2 illustrates an implementation where a serving BS continues a handover procedure according to an exemplary embodiment of the present invention.

FIG. 2 illustrates an implementation where a serving BS continues the ongoing handover procedure according to an exemplary embodiment of the present invention.

Referring to FIG. 2, the $I_B$ signal 212 transmitted by an MS 210 is normally received at a first ASR slot 222 of a serving BS 220 in an ASR period 200. Thereafter, in one case 224a, the serving BS 220 normally receives the $I_B$ 214a transmitted by the MS 210 in a second ASR slot. In another case 224b, the serving BS 220 receives no signal. Thereafter, upon receiving the target BS indicator transmitted by the MS 210, in the next ASR slot 225 after the second ASR slot 224a, the serving BS 220 recognizes that the MS 210 has started the frame transmission to the target BS and sends an "Anchor Switch Indication" for delivering Start Frame to the Target BS.

At the time 226 that the MS 210 switches to the target BS for handover, the serving BS 220 stops the transmission of its DL data and starts DL data transmission in the target BS via a relay station. That is, the stopping of the DL data transmission in the serving BS 220 occurs in the next frame 226 of the reception time of the second $C_A$ of the ASR period 200, and the restart of the DL data transmission in the target BS is performed in the second frame after expiration of the ASR period 200, because of the time delay between the MS and the BS. A detailed description thereof will be made below.

Figure 3:
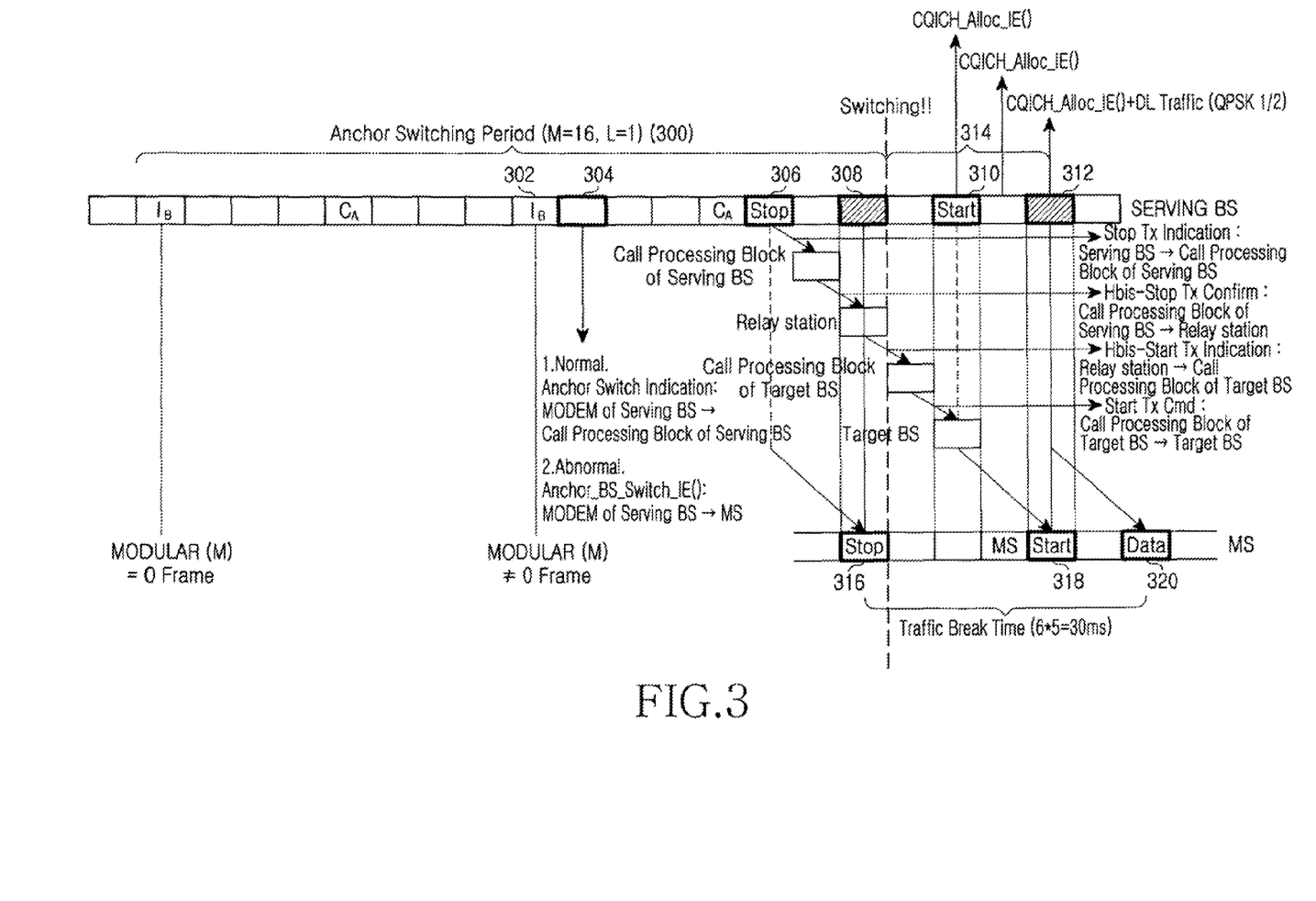
FIG. 3 illustrates a transmission stop/restart procedure for DL data in a BS switching period by a serving BS according to an exemplary embodiment of the present invention.

FIG. 3 illustrates a transmission stop/restart procedure for DL data in a BS switching period by a serving BS according to an exemplary embodiment of the present invention.

Referring to FIG. 3, after normally receiving $I_B$ in the second ASR slot 302, or M≠0 frame, of an ASR period 300, a serving BS transmits time information indicating an 'expected occurrence of BS switching' to the relay station in a next frame 304. This is to prepare for a situation in which a Data Transmission Stop message transmitted from the serving BS to the relay station is missing before the MS performs BS switching. That is, the serving BS transfers the detailed time information required for switching from the relay station to the target BS, along with the 'expected occurrence of BS switching' time information, before the switching occurs. This process, while illustrated in FIG. 3, is explained in more detail below with reference to FIG. 5. Then the target BS, recognizing that the MS will perform handover thereto, starts transmission of corresponding data at time 312 which is the time that the MS receives a message for restarting the transmission of traffic data from the relay station. The restarting of the transmission of traffic data corresponds to the time 308 at which the MS actually performs BS switching.

Because a radio transmission delay from the serving BS to the MS actually occurs for about two frames, the DL data transmission is stopped at a next frame 306 after the time that a second $C_A$ of the ASR period 300 should be received. Therefore, the MS performs switching to the corresponding target BS after the serving BS has processed the DL traffic. That is, because the DL data transmission is stopped at frame 306 and because of the transmission delay of about 2 frames, the transmission of DL data may not be complete until the immediately previous frame 308 of the time that the MS performs switching to the target BS.

Because the delay time between the BS and the MS occurs for about two frames as stated above, CQICH_Alloc_IE is transmitted in a second frame 310 after the BS switching. Thereafter, the MS needs two more frames for re-acquiring synchronization with the target BS and processing DL data, so it suffers from a total delay of about four frames 314. After the BS switching, if the target BS transmits CQICH_Alloc_IE( ) in the second frame 310, the MS suffers from a delay of two frames until it receives the CQICH_Alloc_IE( ). Considering the case where the MS can receive the CQICH_Alloc_IE within the delay time 314, the target BS, after the BS switching, continuously transmits the CQICH_Alloc_IE( ) to the MS for three frames from the second frame 310, and starts the transmission of DL data in the from of Quadrature Phase Shift Keying (QPSK) ½ during transmission of the CQICH_Alloc_IE( ) in the last third frame 312.

After switching to the target BS in the frame 316, the MS receives CQICH_Alloc_IE( ) from the fourth frame 318, given after a 2-frame delay from the frame 310 at which the target BS started the transmission of the CQICH_Alloc_IE, until the sixth frame 320, and starts the reception of DL data in the sixth frame 320.

Because an Adaptive Modulation Codec (AMC) function cannot be enabled before the MS transmits a report on the CQICH, the target BS starts the first modulation for the DL data in the form of QPSK ½ to start the transmission in the default form. Therefore, the target BS needs 3.2 seconds until it first receives a report on the CQICH from the MS. Here, for the CQICH report, about 640 frames and a fixed value of QPSK ½ are used.

As described above, a traffic delay of a total of about 6 frames, or 30 ms, occurs for the period in which the serving BS stops the transmission of DL data and the transmission of the DL data is restarted after BS switching to the target BS. This value is much lower than the maximum traffic delay of 100 ms for VoIP, which is one of the stable real-time QoS services.

Figure 4:
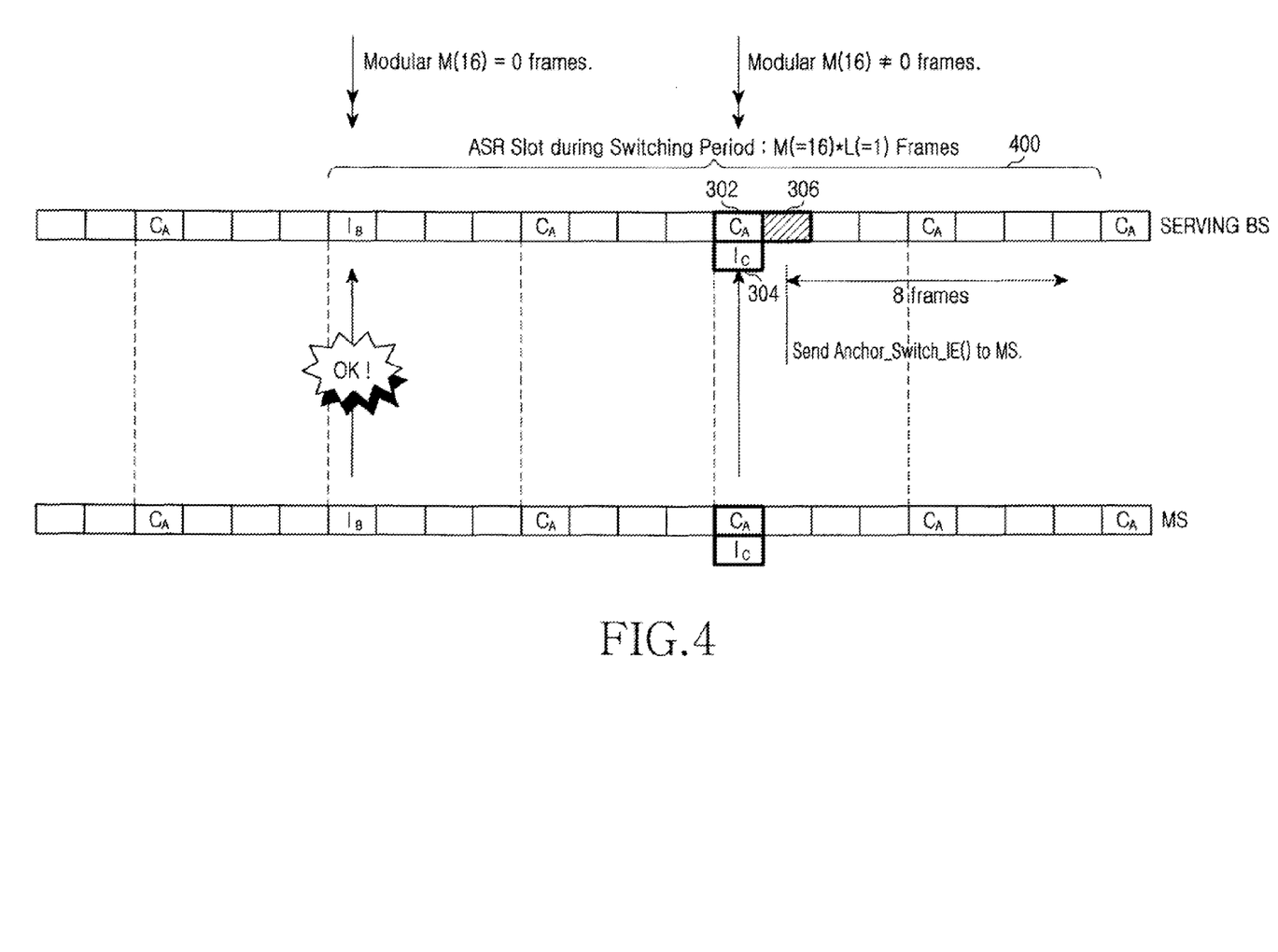
FIG. 4 illustrates an implementation where a serving BS cancels a handover procedure according to an exemplary embodiment of the present invention.

FIG. 4 illustrates an implementation where a serving BS cancels the ongoing handover procedure according to an exemplary embodiment of the present invention.

Referring to FIG. 4, a serving BS receives $I_B$ from an MS in a first ASR slot of an ASR period 400, and then receives, in a second ASR slot, $C_A$ 302 rather than the expected $I_B$ or receives an unknown or wrong $I_C$ 304. In this case, the serving BS sends Anchor_BS_Switch_IE( ) for commanding a cancellation of the ongoing handover, to the MS in a next frame 306.

As described above, in an exemplary embodiment of the present invention, the handover cancel procedure can be simply realized by merely sending the Anchor_BS_Switch_IE( ) from the serving BS to the MS without the need to transmit a particular message to the target BS.

Figure 5:
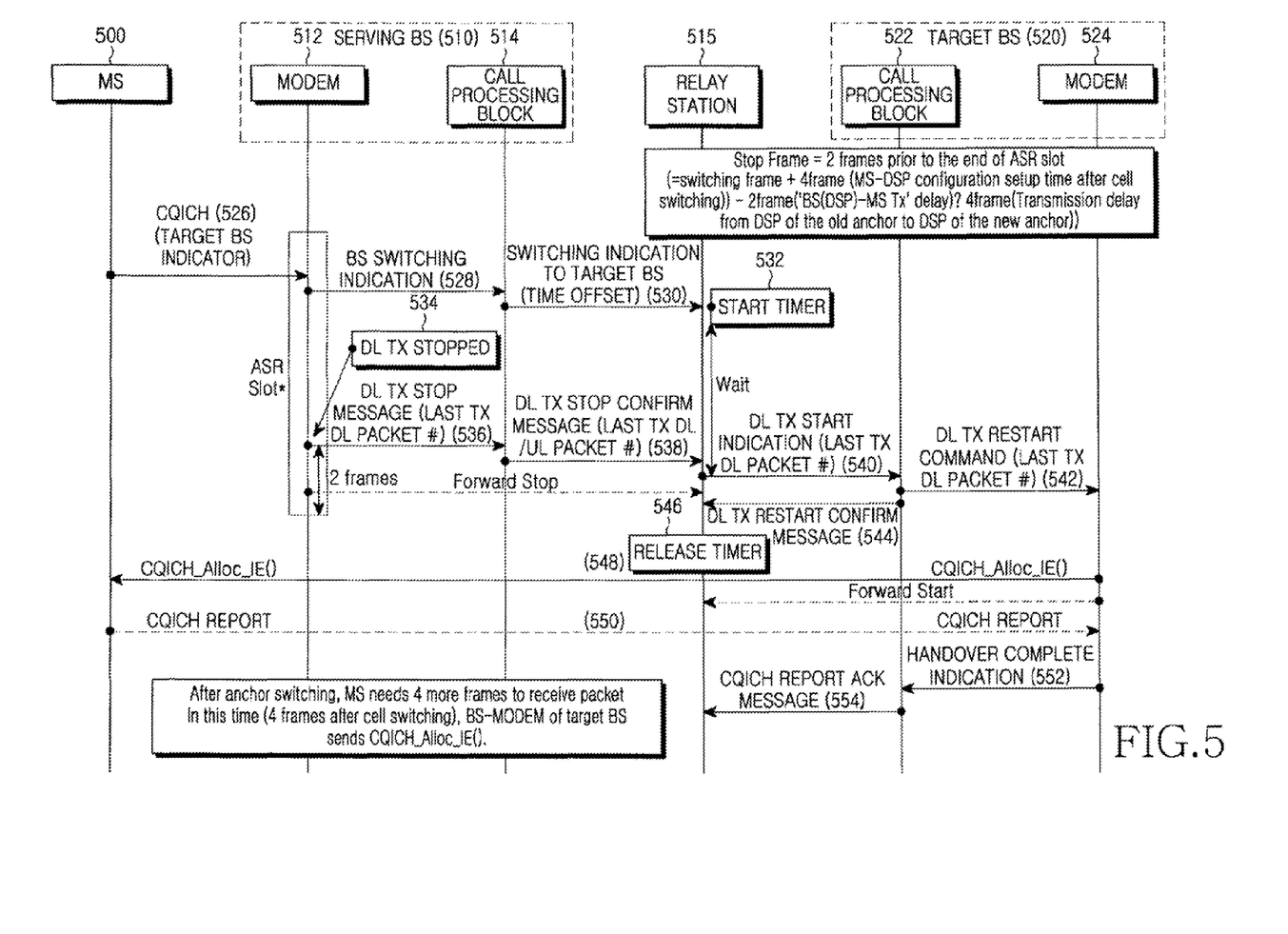
FIG. 5 illustrates a call processing flow for FBSS handover according to an exemplary embodiment of the present invention.

FIG. 5 illustrates a call processing flow for FBSS handover according to an exemplary embodiment of the present invention. Here, the FBSS handover occurs between an MS 500, a serving BS 510 that includes a modem 512 and a call processing block 514, a relay station 515, and a target BS 520 that includes a call processing block 522 and a modem 524. In an exemplary embodiment, the FBSS handover starts from the time that the serving BS 510 detects a target BS indicator from the MS 500 at a second ASR slot in an ASR period.

Referring to FIG. 5, in step 526, the MS 500 sends a CQICH including an indicator of the target BS 520 for the FBSS handover in the second ASR slot. Upon receipt of the CQICH, the modem 512 sends a BS Switching Indication message with an action code='0' to the call processing block 514 in step 528. The BS Switching Indication message is delivered in the initial process of performing handover in the serving BS 510, but the action code is set to distinguish the features based on the situations. For example, if the target BS 520 first receives a CQICH report from the MS 500, the action code is set to '2'.

In step 530, the call processing block 514 sends, to the relay station 515, a BS Switching Indication message to the target BS 520. The BS Switching Indication message includes the detailed information on the time required for switching from the serving BS 510 to the target BS 520, i.e., includes a time offset for a BS switching start time.

In step 532, the relay station 515 starts a timer that operates until a BS switching period of the MS 500 expires. The timer is provided for stopping the transmission of DL data in the serving BS 510 for the BS switching period, and for preparing for the missing (or loss) of a DL data transmission indication command to the target BS 520. That is, when the timer expires and the DL data transmission of the serving BS 510 is stopped, the relay station 515 instructs the target BS 520 to start the DL data transmission.

At a transmission stop time 534 for the DL data, the modem 512 stops the transmission of the DL data, and sends a DL Data Transmission Stop message to the call processing block 514 in step 536. The DL Data Transmission Stop message includes information on the DL data packet number that the serving BS 510 has last transmitted. The DL data packet number is provided to allow the MS 500 to use the intact Traffic Encryption Key (TEK) value for the traffic data, which was used in the serving BS 510, even after the MS 500 performs handover to the target BS 520.

In step 538, the call processing block 514 sends a Data Transmission Stop Confirm message to the relay station 515 to indicate the stop of the data transmission by the serving BS 510. The Data Transmission Stop Confirm message includes a packet number for the final UL/DL transmission data.

In step 540, the relay station 515 sends a DL Data Transmission Start Indication message to the call processing block 522 to instruct the transmission restart for the DL data. The DL Data Transmission Start Indication message includes the DL packet number that the serving BS 510 has last transmitted.

In step 542, if the call processing block 522 sends a DL Data Transmission Restart Command message including the last packet number to the modem 524, the modem 524 restarts the transmission of the DL data. Upon receiving DL Data Transmission Restart Confirm message from the call processing block 522 in step 544, the relay station 515 releases the timer in operation in step 546.

Through the foregoing procedure, the BS switching from the serving BS 510 to the target BS 520 is performed, completing handover.

Thereafter, upon receiving CQICH_Alloc_IE( ) from the target BS 520 in step 548, the MS 500 sends a CQICH report to the target BS 520 in step 550. In step 552, the modem 524 sends a Handover Complete Indication message to the call processing block 522. In step 554, the call processing block 522 sends an Acknowledgement (ACK) message for the CQICH report to the relay station 515.

Figure 6:
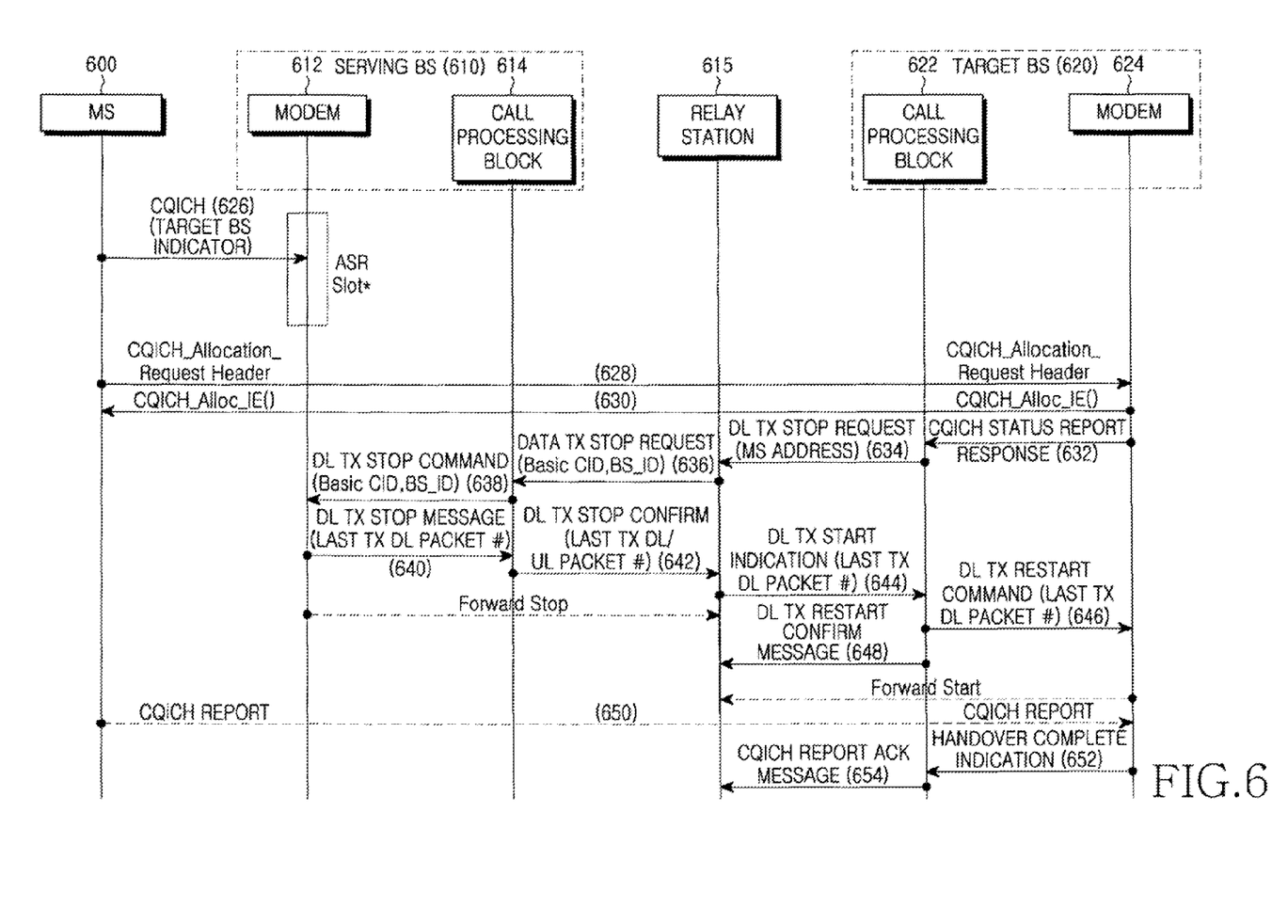
FIG. 6 illustrates a call processing flow for FBSS handover according to an exemplary embodiment of the present invention.

FIG. 6 illustrates a call processing flow for FBSS handover according to an exemplary embodiment of the present invention. Here, the FBSS handover occurs between an MS 600, a serving BS 610 that includes a modem 612 and a call processing block 614, a relay station 615, and a target BS 620 that includes a call processing block 622 and a modem 624.

In this exemplary case, the serving BS 610 fails to detect target BS indicator transmitted by the MS 600 because the channel state for the radio link in the serving BS 610 is poor. That is, in the state where the serving BS 610 has never recognized the completed execution of FBSS handover, the target BS 620 receives data from the MS 600. Thereafter, though the serving BS 610 continuously transmits DL data to the MS 600, the data is missed because the MS 600 has actually moved to the target BS 620. Therefore, the target BS 620 sends a transmission stop indication for the DL data to the serving BS 610 via the relay station 615, and then restarts the DL data transmission.

Referring to FIG. 6, in step 626, the MS 600 sends a CQICH including an indicator of the target BS 620 to serving BS 610 for an ASR period. Here, as the modem 612 has failed to detect the target BS indicator or has missed the CQICH, the serving BS 610 continuously maintains the state before the occurrence of the handover.

Thereafter, if the ASR period expires and the MS 600 moves to the target BS 620 and acquires synchronization therewith, the MS 600 sends CQICH_Allocation_Request_Header for requesting allocation of a CQI channel, to the target BS 620 in step 628. The modem 624 sends CQICH_Alloc_IE( ) for CQI channel allocation to the MS 600 in step 630, and sends a CQI Channel Status Report Response message to the call processing block 622 in step 632.

In step 634, the call processing block 622 sends a DL Data Transmission Stop Request message to the relay station 615. The DL Data Transmission Stop Request message includes a Media Access Control (MAC) Address value, an address of the MS 600, to indicate whether the handover is BS switching handover for the MS 600. In step 636, the relay station 615 sends a DL Data Transmission Stop Request message to the call processing block 614. The DL Data Transmission Stop Request message includes a Basic Connection Identifier (CID) of MS and BS_ID information, based on which the serving BS 610 will stop the data transmission in the corresponding sub-cell. In step 638, the call processing block 614 sends a DL Data Transmission Stop command message with the Basic CID of MS and the BS_ID to the modem 612.

Thereafter, the modem 612 stops the transmission of DL data, and sends a DL Data Transmission Stop message to the call processing block 614 in step 640. The DL Data Transmission Stop message includes the DL data packet number information that the serving BS 610 has last transmitted.

In step 642, the call processing block 614 sends a Data Transmission Stop Confirm message to the relay station 615 to indicate the stop of the data transmission by the serving BS 610. The Data Transmission Stop Confirm message includes the last transmitted UL/DL data packet number.

In step 644, the relay station 615 sends a DL Data Transmission Start Indication message to the call processing block 622 to instruct the transmission restart of the DL data. The DL Data Transmission Start Indication message includes the DL packet number that the serving BS 610 has last transmitted.

In step 646, if the call processing block 622 sends a DL Data Transmission Restart Command message with the last packet number to the modem 624, the modem 624 restarts the transmission of the DL data. Also, if the call processing block 622 sends the DL Data Transmission Restart Command message to the modem 624, then in step 648 the call processing block 622 sends a DL Data Transmission Restart Confirm message to the relay station 615. Thereafter, upon receipt of CQICH_Alloc_IE( ) from the target BS 620, the MS 600 sends a CQICH report to the modem 624 in step 650. In step 652, the modem 624 sends a Handover Complete Indication message to the call processing block 622. In step 654, the call processing block 622 sends an ACK message for the CQICH report to the relay station 615.

Figure 7:
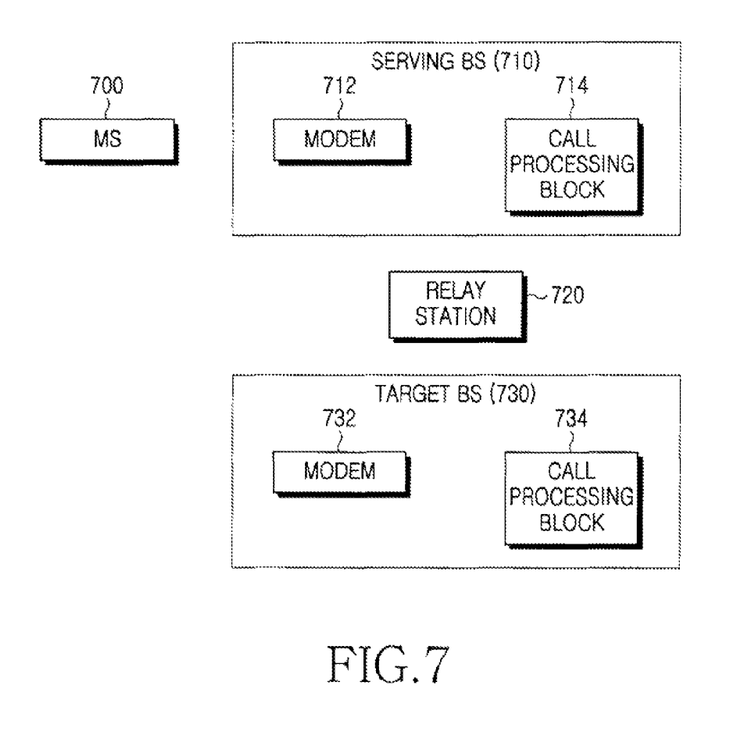
FIG. 7 illustrates a configuration of a communication system according to an exemplary embodiment of the present invention.

FIG. 7 illustrates a configuration of a communication system according to an exemplary embodiment of the present invention.

Referring to FIG. 7, the communication system includes an MS 700 intending to perform FBSS handover, a serving BS 710 that includes a modem 712 and a call processing block 714, a relay station 720, and a target BS 730 that includes a modem 732 and a call processing block 734.

The MS 700 sends an indicator of the target BS 730, to which it will perform FBSS handover, to the serving BS 710 over a CQICH. Upon normally receiving information on the indicator received from the MS 700 in the second ASR frame of the ASR period, the serving BS 710 continuously performs the handover to the target BS 730 according to the procedures of FIGS. 3 and 5 based on an exemplary embodiment. A detailed description of the procedures has been made above. Upon failure to normally receive the information on the indicator received from the MS 700 in the second ASR frame, the serving BS 710 cancels the handover to the target BS 730 according to the procedures of FIGS. 4 and 6 based on an exemplary embodiment.

As is apparent from the foregoing description, the present invention uses the optimized value of the time information for BS switching, thereby minimizing the DL transmission delay time for the traffic data, which may occur during handover. In addition, exemplary embodiments of the present invention can prevent the possible deviation for the BS switching period between the MS and the system, and remarkably reduce the number of various abnormal cases possibly caused by the deviation, thereby facilitating maximized stability of the system that performs handover.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A handover method of a serving Base Station (BS) in a communication system, the method comprising:
   the serving BS alternately receiving a target BS indicator and a downlink (DL) channel status report from a Mobile Station (MS) at intervals of preset frames in a BS switching period; and
   if a signal, received in at least one of a first frame corresponding to a first reception of the target BS indicator and a second frame corresponding to a second reception of the target BS indicator, comprises the target BS indicator, the serving BS determining to continue the handover,
   wherein if signals, received in both of the first and second frames, comprise the same target BS indicator and the DL channel status report is not received in the interval of preset frames after an expiration of the BS switching period, the serving BS determines to cancel the handover.

2. The handover method of claim 1, wherein the determining comprises:
   upon receiving the target BS indicator in the second frame or upon failure to receive any signal in the second frame, performing handover to the target BS.

3. The handover method of claim 1, wherein the determining comprises:
   upon receiving a DL channel status report in the second frame, canceling handover.

4. The handover method of claim 1, wherein the determining comprises:
   upon receiving an indicator of a BS other than the target BS in the second frame, canceling the handover.

5. The handover method of claim 1, further comprising:
   if the signal received in the second frame comprises the target BS indicator, the serving BS sending to a relay station a BS Switching Indication message including time information for switching to the target BS; and
   after switching to the target BS, the serving BS stopping DL data transmission to the MS, and the serving BS sending to the relay station a DL Data Transmission Stop Confirm message including a DL data number last transmitted to the MS.

6. The handover method of claim 5, wherein the sending of the DL Data Transmission Stop Confirm message further comprises:
   sending the DL Data Transmission Stop Confirm message upon receiving no signal in the frame.

7. The handover method of claim 6, wherein the time information indicates a BS switching time to the target BS by the MS when the DL Data Transmission Stop message is missing.

8. The handover method of claim 7, further comprising:
   upon receiving the BS Switching Indication message, starting by the relay station a timer for counting the time information;
   upon receiving the DL Data Transmission Stop message, sending by the relay station a DL Data Transmission Restart Command message including the last transmitted DL data number to the target BS; and
   releasing the timer upon receiving a DL Data Transmission Restart Confirm message from the target BS that has restarted the DL data transmission.

9. The handover method of claim 8, wherein the releasing comprises:
   sending, by the target BS, CQICH_Alloc_IE indicative of a channel quality indicator to the MS for three consecutive frames, one frame after a time that the MS has completed handover to the target BS.

10. The handover method of claim 9, further comprising:
    sending by the target BS the CQICH_Alloc_IE with DL data in a frame where it sends CQICH_Alloc_IE( ) to the MS the third time.

11. The handover method of claim 10, further comprising:
    variably applying a modulation scheme after first receiving the channel status report from the MS.

12. The handover method of claim 1, further comprising:
    when it is determined that the target BS indicator is missing or failed to be detected in the second frame, sending by the MS a Channel Quality Indicator (CQI) Channel Request message to the target BS after BS switching to the target BS; and
    receiving CQICH_Alloc_IE for CQI channel allocation from the target BS.

13. A handover apparatus in a communication system, the apparatus comprising:
    a serving Base Station (BS) for alternately receiving a target BS indicator and a downlink (DL) channel status report from a Mobile Station (MS) at intervals of preset frames in a BS switching period for handover of the MS, and for, if a signal, received in at least one of a first frame corresponding to a first reception of the target BS indicator and a second frame corresponding to a second reception of the target BS indicator, comprises the target BS indicator, determining to continue the handover,
    wherein if signals, received in both of the first and second frames, comprise the same target BS indicator and the DL channel status report is not received in the interval of preset frames after an expiration of the BS switching period, the serving BS determines to cancel the handover.

14. The handover apparatus of claim 13, wherein upon receiving the target BS indicator in the second frame or upon failure to receive any signal in the second frame, the serving BS performs handover to the target BS.

15. The handover apparatus of claim 13, wherein upon receiving a DL channel status report in the second frame, the serving BS cancels handover.

16. The handover apparatus of claim 13, wherein upon receiving an indicator of a BS other than the target BS in the second frame, the serving BS cancels the handover.

17. The handover apparatus of claim 13, wherein the serving BS:
    if the signal received in the second frame comprises the target BS indicator or no signal is received, sends to a relay station a BS Switching Indication message including time information for switching to the target BS; and
    after switching to the target BS, stops DL data transmission to the MS, and sends to the relay station a DL Data Transmission Stop Confirm message including a DL data number last transmitted to the MS.

18. The handover apparatus of claim 17, wherein the time information indicates a BS switching time to the target BS by the MS when the DL Data Transmission Stop message is missing.

19. The handover apparatus of claim 18, wherein the relay station:
    upon receiving the BS Switching Indication message, starts a timer for counting the time information;

upon receiving the DL Data Transmission Stop message, sends a DL Data Transmission Restart Command message including the last transmitted DL data number to the target BS; and releases the timer upon receiving a DL Data Transmission Restart Confirm message from the target BS that has restarted the DL data transmission.

20. The handover apparatus of claim 19, wherein the target BS sends CQICH_Alloc_IE indicative of a channel quality indicator to the MS for three consecutive frames, one frame after a time that the MS has completed handover to the target BS.

21. The handover apparatus of claim 20, wherein the target BS sends the CQICH_Alloc_IE with DL data in a frame where it sends CQICH_Alloc_IE( ) to the MS the third time.

22. The handover apparatus of claim 13, wherein the serving BS variably applies a modulation scheme after first receiving the channel status report from the MS.

23. The handover apparatus of claim 13, wherein when it is determined that the target BS indicator is missing or failed to be detected in the second frame, the MS sends a Channel Quality Indicator (CQI) Channel Request message to the target BS after BS switching to the target BS, and receives CQICH_Alloc_IE for CQI channel allocation from the target BS.

\* \* \* \* \*